(12) United States Patent  (10) Patent No.: US 7,264,473 B1
Williams  (45) Date of Patent: Sep. 4, 2007

(54) REPLACEABLE FACEPLATES FOR PERIPHERAL DEVICES

(75) Inventor: Brian D. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 10/871,733

(22) Filed: Jun. 18, 2004

Related U.S. Application Data

(63) Continuation of application No. 10/447,890, filed on May 29, 2003, now Pat. No. 6,786,731, and a continuation-in-part of application No. 09/823,714, filed on Mar. 30, 2001, now Pat. No. 6,686,904, which is a continuation-in-part of application No. 09/782,575, filed on Feb. 13, 2001, now Pat. No. 6,595,780.

(51) Int. Cl.
G09B 13/00 (2006.01)
(52) U.S. Cl. ..................................... 434/227
(58) Field of Classification Search ................ 434/258, 434/227–233, 259, 301, 311, 334, 343, 345; 273/237, 238; 446/297, 397, 404, 227
See application file for complete search history.

(56) References Cited

U.S. PATENT DOCUMENTS

| | | | | |
|---|---|---|---|---|
| 4,075,465 A | * | 2/1978 | Funk et al. | 235/145 R |
| 4,119,839 A | * | 10/1978 | Beckmann et al. | 235/145 R |
| 4,991,117 A | | 2/1991 | Iwamura et al. | 345/686 |
| 5,088,928 A | * | 2/1992 | Chan | 434/339 |
| 5,451,178 A | | 9/1995 | Yorozu et al. | 446/175 |
| 5,473,344 A | | 12/1995 | Bacon et al. | 345/163 |
| 5,538,432 A | | 7/1996 | Dondero et al. | 434/258 |
| 5,636,995 A | * | 6/1997 | Sharpe et al. | 434/317 |
| 5,813,861 A | * | 9/1998 | Wood | 434/169 |
| 5,855,483 A | | 1/1999 | Collins et al. | 434/322 |
| 5,877,758 A | | 3/1999 | Seybold | 345/866 |
| 5,906,369 A | | 5/1999 | Brennan et al. | 273/238 |
| 5,910,009 A | * | 6/1999 | Leff et al. | 434/322 |
| 5,912,661 A | | 6/1999 | Siddiqui | 345/166 |
| 6,040,516 A | | 3/2000 | Masuda | 84/622 |
| 6,089,872 A | * | 7/2000 | Mayhue et al. | 434/233 |

(Continued)

OTHER PUBLICATIONS

Microsoft Corporation. "Windows Platform Design Notes: Keyboard Scan Code Specification." Rev. 1.3a Mar. 16, 2000: 34pp.

(Continued)

*Primary Examiner*—Kurt Fernstrom
(74) *Attorney, Agent, or Firm*—Workman Nydegger

(57) ABSTRACT

Automatically determining which one of a plurality of functions is to be associated with a movable member of an electronic device, depending on which one of a plurality of faceplates is coupled to the electronic device. A selected faceplate is coupled to a keyboard or other electronic device with movable members such as keys, buttons, knobs, etc. Protrusions or other configuration characteristics of the faceplate interface with one or more faceplate sensors, such as switches, that detect which faceplate is coupled to the electronic device. Based on the state of the faceplate sensors, the electronic device selects a predefined code, such as a scan code, that represents the coupled faceplate. The selected predefined code is communicated to a host computing device according to a keyboard protocol such as PS/2 or universal serial bus (USB). Consequently, an individual function is associated with each movable member based on the coupled faceplate.

20 Claims, 5 Drawing Sheets

U.S. PATENT DOCUMENTS

| | | | |
|---|---|---|---|
| 6,246,397 B1 | 6/2001 | Vossler | 345/204 |
| 6,263,392 B1 | 7/2001 | McCauley | 710/305 |
| 6,287,560 B1 | 9/2001 | Fujii | 434/127 |
| 6,290,565 B1 | 9/2001 | Galyean III et al. | 446/99 |
| RE37,422 E | 10/2001 | Yamada et al. | 84/600 |
| 6,312,175 B1 | 11/2001 | Lum | 400/472 |
| 6,323,873 B1 | 11/2001 | Liebenow | 345/619 |
| 6,406,300 B1 | 6/2002 | Cohen | 434/227 |
| 6,429,793 B1 | 8/2002 | Paolini | 341/22 |
| 6,494,375 B1 | 12/2002 | Ishibashi et al. | 235/462.11 |
| 6,641,401 B2 | 11/2003 | Wood et al. | 434/159 |
| 6,747,578 B1 * | 6/2004 | Lam et al. | 341/22 |

OTHER PUBLICATIONS

IntelliTools, Inc. "Introduction to IntelliKeys® Windows Tutorial." Rev. Dec. 8, 1998: 9pp.

"IntelliKeys® Keyboard: The Many Faces of IntelliKeys." n.d.: 3pp. Available http://www.intellitools.com/Products/IntelliKeys/home.htm.

"System Requirements for the IntelliTools Access Pacs 2." Jan. 2001: 1pg. Available http://www.intellitools.com/techsupport/OS_sysreqmnts/accpac2.htm.

IntelliTools, Inc. "Professional Adaptability with IntelliKeys®." n.d.: 2pp. Available http://www.intellitools.com/Users/Computer%20Access/professional.htm.

"Do It Yourself Templates." n.d.:2pp. Available http://hooleon.com/prod-diy-tm.htm.

"Pressure Sensitive Keypad™ (the PSK™)." Jan. 30, 2003; 4pp. Available http://www.vitgn.com/psk.htm.

"Thomas' Trackside Station." 2003.: 2pp. Available http://www.ttstation.com/z_games_inf22270.html.

Ideazon, Inc. Oct. 10,2002. Ideazon, Inc. Enters High Tech World at COMDEX:Sneak preview of Ideazon's Z-Board™ demonstrates new ways to interact with computers. 3pp. Available http://www.ideazon.com/newWebSite/news/newsArchive2.htm.

PC World. Nov. 20, 2002. New Devices Support Data Entry in Style: Mouse, keyboard, pen devices support ergonomics, application-specific functions. 2pp. Available http://www.pcworld.com/news/article/0,aid,107120,00.asp.

* cited by examiner

REPLACEABLE FACEPLATES FOR PERIPHERAL DEVICES

RELATED APPLICATIONS

This application is a continuation of a patent application Ser. No. 10/447,890, filed on May 29, 2003 now U.S. Pat. No. 6,786,731, which is a continuation-in-part (CIP) of both U.S. patent application Ser. No. 09/782,575, filed on Feb. 13, 2001 and issued as U.S. Pat. No. 6,595,780 on Jul. 22, 2003, and U.S. patent application Ser. No. 09/823,714, filed on Mar. 30, 2001 and issued as U.S. Pat. No. 6,686,904 on Feb. 3, 2004, the benefit of the filing dates of which is hereby claimed under 35 U.S.C. § 120, and the specifications and drawings of which are hereby specifically incorporated herein by reference.

FIELD OF THE INVENTION

The present invention generally relates to a method and system to detect which of a plurality of modules is installed in or on an electronic device to select a corresponding functional behavior that will be applied when using the electronic device, and more specifically, pertains to the use of a plurality of sensors to identify a faceplate installed on a peripheral device and in response, automatically activating appropriate key functions corresponding to the installed faceplate.

Electronic keyboards and other electronic devices often include a number of different groups of keys, each group being intended for related, but different functions. For example, computer keyboards typically have a group of alphanumeric keys arranged in a predefined configuration, such as that used in conventional QWERTY or Dvorak configurations, that enable a user to input text into a host computer. Computer keyboards also typically include a group of numeric keys that are spaced apart from the alphanumeric keys to enable the user to more conveniently enter numbers with one hand, e.g., in connection with accounting operations. A number of other key groups include editing keys (e.g., delete, insert, home, end, page up, page down, etc.), navigation keys (e.g., cursor controlling arrow keys), action keys (e.g., escape, print screen, scroll lock, etc.) and hot keys (e.g., email, browser, calculator, etc.). The individual keys of these key groups typically include a decal or other marking that identifies the function(s) of the key. However, computer keyboards further typically include a group of 10 or 12 assignable function keys that are not identified as performing a specific function. Instead, these function keys are usually simply marked with generic labels, such as F1-F12. The function keys can be assigned different functions by the user or by software applications that are executed on the computer to which the keyboard is attached. This ability to reassign the functions of the function keys makes them versatile, but the generic labels do not indicate the functions that are currently assigned to each of the function keys.

To help users remember the functions that are assigned to the function keys, paper or plastic templates have sometimes been provided to be placed around the function keys. The templates are labeled (by the manufacturer or by the user) to indicate the function that is associated with each function key. For a commercial software application, the template that is supplied will indicate functions that are automatically assigned by the software application. Self-made templates require the user to write an indication of the function key assignments and initiate the assignment each time that the self-made template is employed. In any case, both pre-manufactured templates and self-made templates often slip out of position, become damaged or torn, or are misplaced by the user.

A few other approaches have been employed to assign and identify keys on a keyboard. One approach includes placing an overlay over a pressure sensitive panel; an example of this approach is the INTELLIKEYS® panel produced by IntelliTools, Inc. Each of a number of overlays include graphic indications of the functions available via the overlay. Each overlay is identified by a bar code that is read by the panel when an overlay is installed into a slot over the panel. A user presses on a graphic of the installed overlay to implement the desired function that is associated with that graphic and the corresponding bar code identifying the overlay. However, this approach requires that a pressure sensitive panel be used, which is more costly and more easily damaged than a conventional keyboard.

Another approach places a mechanical device over a conventional keyboard, and actuates the keys of the keyboard with movable members of the mechanical device. For example, a toy train keytop playset distributed by Gullane (Thomas) Ltd. can be placed on a conventional keyboard to identify functions of the keys that are specific to a train driving computer game. Rather than trying to remember which keyboard keys perform a function of the computer game, a user can actuate mechanical levers on the playset, such as a throttle, which mechanically actuate specific keys on the underlying keyboard. The computer game software interprets the key actuations to perform functions associated with the mechanical levers. However, each mechanical system is dedicated to a different specific software application, is susceptible to slipping, and requires more movable parts, which introduces more failure points.

It is desirable to provide a more flexible device that uses a common set of switches to accomplish a variety of different functions associated with each of a plurality of different modules. Utilizing a single keyboard base with a variety of removable modules should help to reduce costs of such an approach, because the keyboard base unit is used with all of the modules and includes all of the electronic circuitry, and less expensive, removable modules can be used to identify a wide variety of alternate sets of functions. Currently, no modules having this flexibility are available.

SUMMARY OF THE INVENTION

The present invention provides a method and system for automatically determining which one of a plurality of functions is to be associated with a movable member of an electronic device, depending on which one of a plurality of faceplates is coupled to the electronic device. A user can couple a selected faceplate to a keyboard or other electronic device with movable members such as keys, buttons, knobs, etc. Preferably, the faceplate includes graphics illustrating the function of each movable member. The faceplate can also include the movable members, which can interface with switches, sensors, transducers, or other sensors of the electronic device to indicate a state of each movable member. The selected faceplate also interfaces with one or more faceplate sensors that automatically detect which faceplate is coupled to the electronic device. Preferably, the faceplate sensors detect protrusions or other configuration characteristics of each faceplate to identify which faceplate is coupled to the electronic device. Based on the state of the faceplate sensors, the electronic device preferably selects a predefined code, such as a PS/2 scan code, that represents the coupled faceplate, and which is communicated to a host device. Consequently, a function is associated with each movable member based on the coupled faceplate.

Another aspect of the invention is more specifically directed to a keyboard that can be coupled to a host computing device to communicate a predefined code indicating which one of a number of faceplates is coupled to the keyboard. Correspondingly, the predefined code indicates one of a number of functions to be associated with a key of the keyboard. The keyboard includes at least one key, a faceplate detector, a memory, and a processor that selects the predefined code as a function of a state of the faceplate detector. The processor communicates the predefined code as an output signal that conforms to a keyboard communication protocol, such as PS/2 or universal serial bus (USB). Another aspect of the invention comprises a machine readable medium disposed in the keyboard for storing machine readable instructions that cause the processor to automatically detect which faceplate is coupled to the keyboard. A further aspect of the invention comprises a machine readable medium storing machine readable instructions that cause a host computing device to associate one of a plurality of functions with a key, based on the detected faceplate, so that the one associated function is performed in response to actuation of the key.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
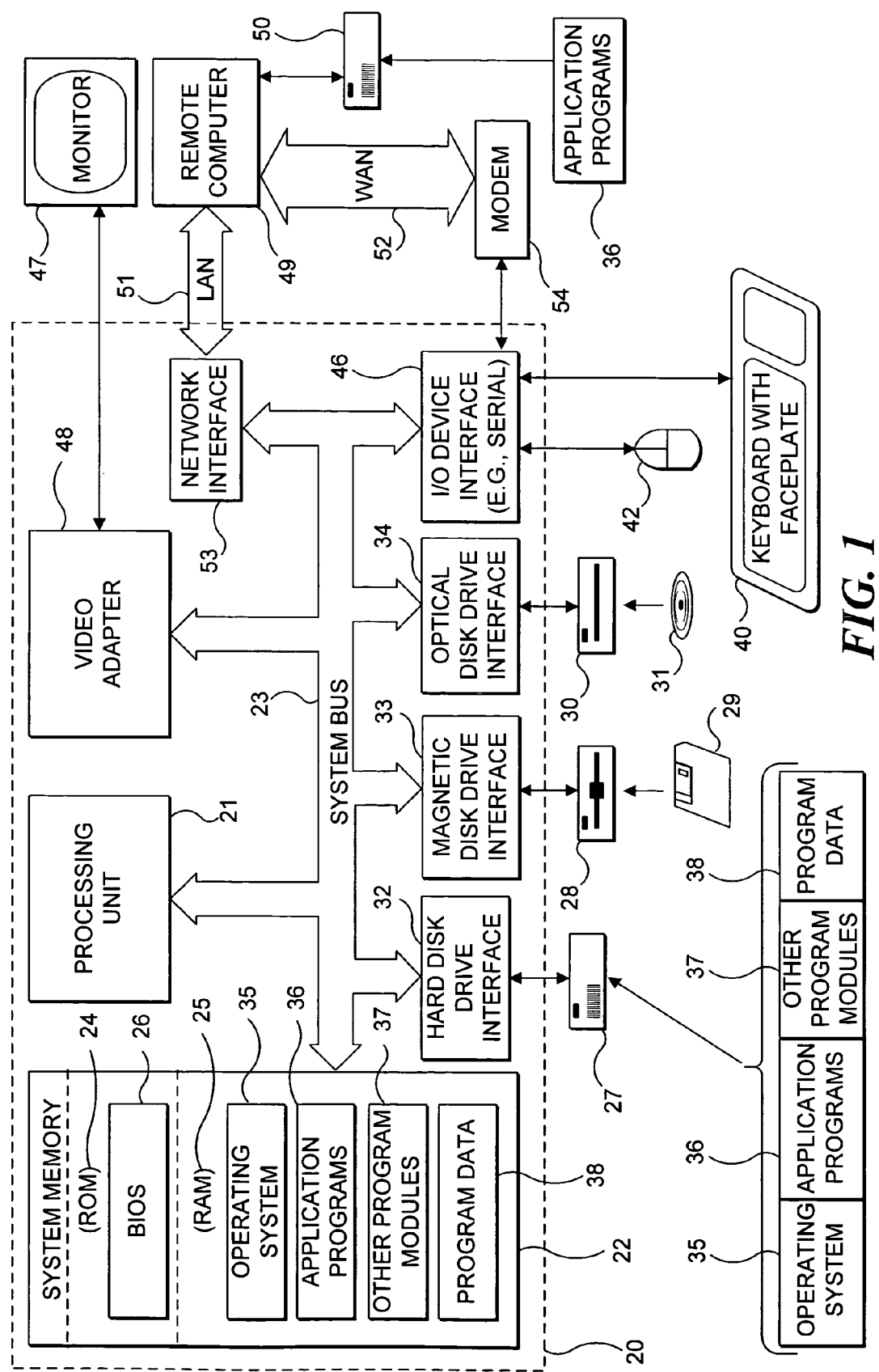
FIG. 1 is a functional block diagram illustrating an exemplary computing system for use with the present invention and includes a general purpose computing device in the form of a conventional PC.

FIG. 1 and the following discussion are intended to provide a brief, general description of a suitable host computing device with which the present invention may be used. Although not required, the present invention will typically be used with a host computing device that executes computer instructions, such as program modules. These computer instructions are executed by a processor in the host computing device computer. In addition, the keyboard includes a processor that executes machine instructions to transmit coded signals to the host computing device to identify an installed faceplate and indicate activation of a key associated with a faceplate. For exemplary purposes, the following description will primarily discuss selection and transmission of PS/2 scan codes. However, those skilled in the art will recognize that USB human interface device (HD) reports, or other coded signals can be used.

Generally, program modules implemented on the host computing device (some of which will be used in connection with the present invention) include routines, programs, objects, components, data structures, etc. that perform particular tasks or implement particular abstract data types. Moreover, those skilled in the art will appreciate that this invention may be practiced with other types of host computing devices, including hand-held devices, pocket personal computing devices, programmable consumer electronic devices, multiprocessor systems, network PCs, laptop computers, minicomputers, mainframe computers, and the like. The invention may also be practiced with computing devices in distributed computing environments that include remote processing devices linked through a communications network. In a distributed computing environment, program modules may be located in both local and remote memory storage devices.

With reference to FIG. 1, an exemplary computing system for use with the present invention includes a general purpose computing device in the form of a conventional PC 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within PC 20, such as during start up, is stored in ROM 24. PC 20 further includes a hard disk drive 27 for reading from and writing to a hard disk, not shown, a magnetic disk drive 28 for reading from or writing to a removable magnetic disk 29, and an optical disc drive 30 for reading from or writing to a removable optical disc 31, such as a CD-ROM or other optical media Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules and other data for PC 20. Although the exemplary environment described herein employs a hard disk, removable magnetic disk 29, and removable optical disc 31, it will be appreciated by those skilled in the art that other types of computer-readable media, which can store data that is accessible by a computer, such as magnetic cassettes, flash memory cards, digital video disks, Bernoulli cartridges, RAMs, ROMs, and the like, may also be used in the exemplary operating environment. A number of program modules may be stored on the hard disk, magnetic disk 29, optical disc 31, ROM 24, or RAM 25, including an operating system 35, one or more application programs 36, other program modules 37, and program data 38.

A user may enter commands and information into PC 20 through input devices such as a keyboard 40 that includes provisions for a faceplate in accord with the present invention, and through a separate pointing device 42. Further detail regarding keyboard 40 is described below with respect to FIGS. 2 through 4. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface commonly employed on computing devices, including a serial port, a parallel port, a game port, an infrared port, a radio frequency port, and/or a USB port (not separately shown). However, a primary focus of this disclosure is on the PS/2 keyboard interface, to which keyboard 40 will normally be coupled and with which it will communicate scan codes indicative of a faceplate coupled to keyboard 40. Alternatively, keyboard 40 can be coupled to the USB port of the I/O interface, and in this case, will communicate USB-formatted data indicative of the movement of the wheel or slider and of the keys depressed on the keyboard.

A monitor 47 or other type of display device is also connected to system bus 23 via an appropriate interface, such as a video adapter 48, and is usable to display Web pages and/or other information. The keys associated with the faceplate on keyboard 40 can be used to control predefined functions of a program running on PC 20 and displayed on the monitor. In addition to the monitor, PCs are often coupled to other peripheral output devices (not shown), such as speakers (through a sound card or other audio interface—not shown) and printers.

PC 20 may operate in a networked environment using logical connections to one or more remote computers, such as a remote computer 49. Remote computer 49 may be another PC, a server (which is typically configured much like PC 20), a router, a network PC, a peer device, a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is connected to system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Functional Keyboard Component System

Figure 2:
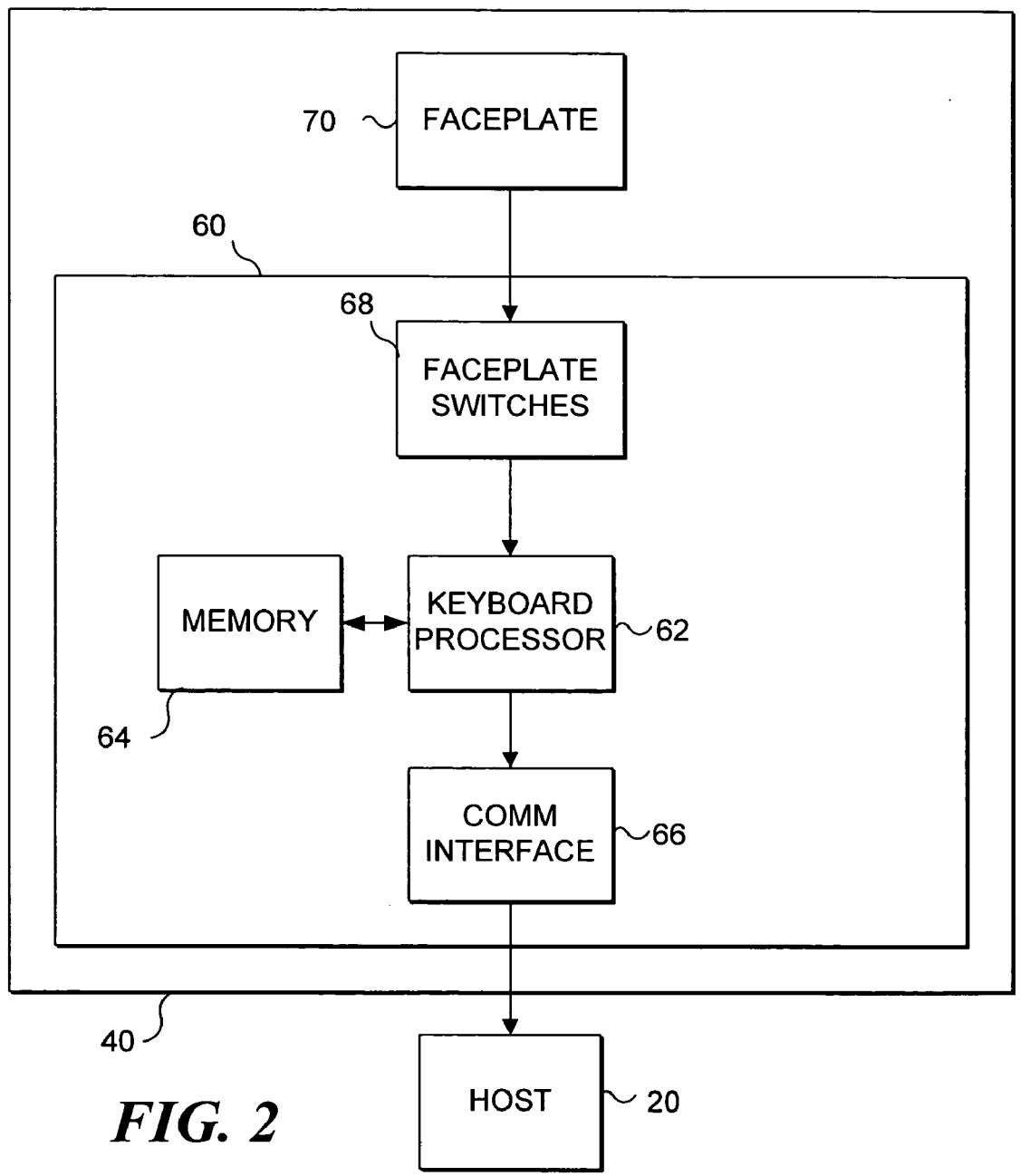
FIG. 2 is a functional block diagram illustrating a system employed in a keyboard for detecting a faceplate and communicating an identifier of the faceplate to a PC.

Although the invention can be applied to any electronic device, FIG. 2 is a functional block diagram illustrating a system 60 employed in keyboard 40 for detecting a faceplate 70 and communicating an identifier of the faceplate to a PC 20. The identifier of faceplate 70 is represented by a PS/2 keyboard scan code as a function of the states of faceplate switches 68. Faceplate switches 68 are activated by pins on a bottom surface of faceplate 70. A processor 62 in communication with faceplate switches 68 selects a predefined scan code representing the installed faceplate. Processor 62 makes the scan code selection by executing machine instructions stored in a memory 64 that is in communication with the processor. Memory 64 comprises ROM or erasable programmable read only memory (EPROM), and RAM. In addition to the machine instructions, a plurality of predefined scan codes from which processor 62 can select are also stored in memory 64.

System 60 also includes a communication interface 66 between processor 62 and a host computing device such as PC 20, to convey the output signal that includes the selected scan code. Communication interface 66 may automatically detect whether to use the PS/2 keyboard scan code protocol, or the USB protocol, as described above, when the keyboard is connected to the host computing device.

Preferred Embodiment of Keyboard & Faceplate

Figure 3:
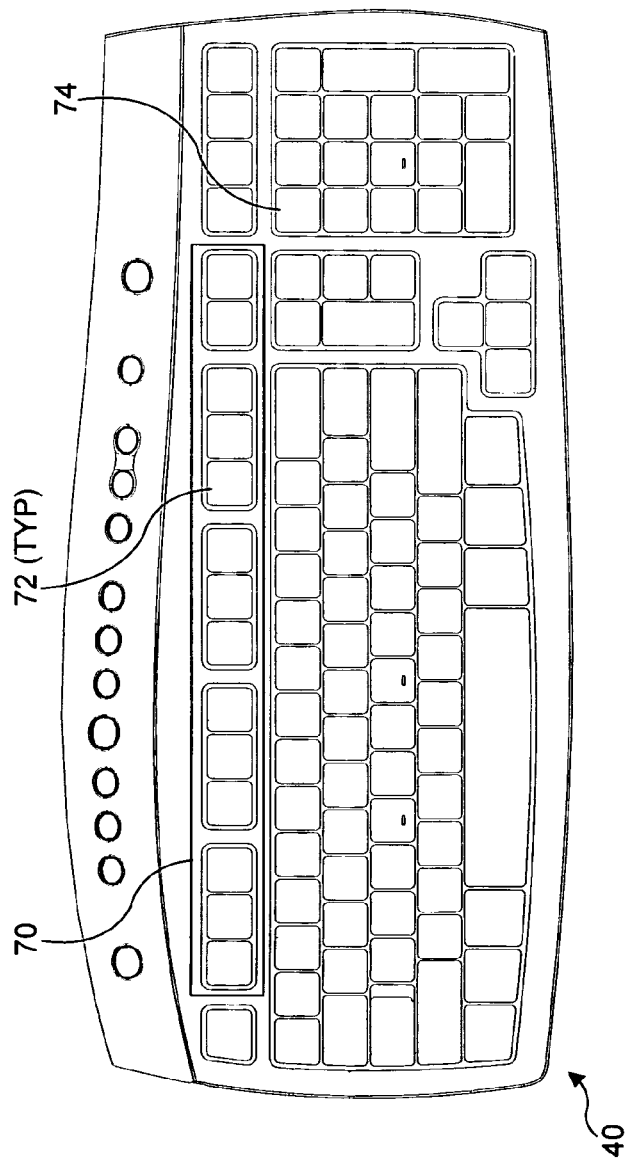
FIG. 3 is a plan view of keyboard illustrating a faceplate installed over a plurality of typical function keys.

The following describes further details of a preferred embodiment of the present invention. FIG. 3 is a plan view of keyboard 40 illustrating faceplate 70 installed over a plurality of typical function keys 72. Unused PS/2 keyboard scan codes are employed to indicate which of a plurality of faceplates are installed. Each faceplate that is thus identified causes the function keys to perform specific predefined functions that are associated with the faceplate. The faceplate preferably includes a decal (not shown) that identifies the predefined function for each key encompassed by the faceplate. Those skilled in the art will recognize that the faceplate can include keys that are movable relative to a housing of the faceplate. In this case, the keys are movable members of the faceplate. Those skilled in the art will also recognize that a faceplate can be installed over conventional keys of the keyboard to modify the function of the underlying conventional keys. For example, different faceplates can be applied to numeric keys 74 to implement different functions, such as selected financial calculations, statistical calculations, etc.

Figure 4:
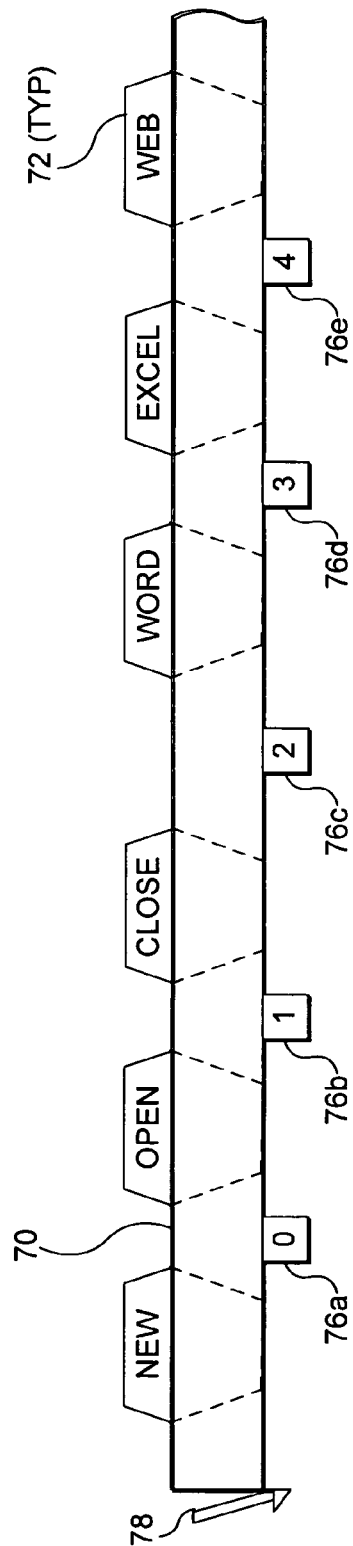
FIG. 4 is a partial front view of a faceplate over function keys.

FIG. 4 is a partial front view of faceplate 70 installed over function keys 72. Faceplate 70 includes a clip 78 for securing the faceplate to the keyboard. Faceplate 70 also includes pins 76a-76e that activate faceplate switches (not shown) in the keyboard. When the faceplate is installed in the keyboard, a predefined subset of pins 76a-76e depress the faceplate switches to identify which faceplate is installed. For instance, an office productivity faceplate can activate a number of predefined functions related to office productivity software. Alternatively, an email faceplate can activate a number of predefined functions related to email software. The number of faceplate switches determines the number of different faceplates that can be identified. For example, five faceplate switches enable use of 31 different faceplates. The specific pins that are present on the faceplate can also be used to identify a particular faceplate. If pins 76b and 76c are present, the faceplate can be identified by a decimal 6 corresponding to a sum of binary numbers associated with the pins (i.e., $2^2+2^1=4+2=6$).

Keyboard Processing

Figure 5:
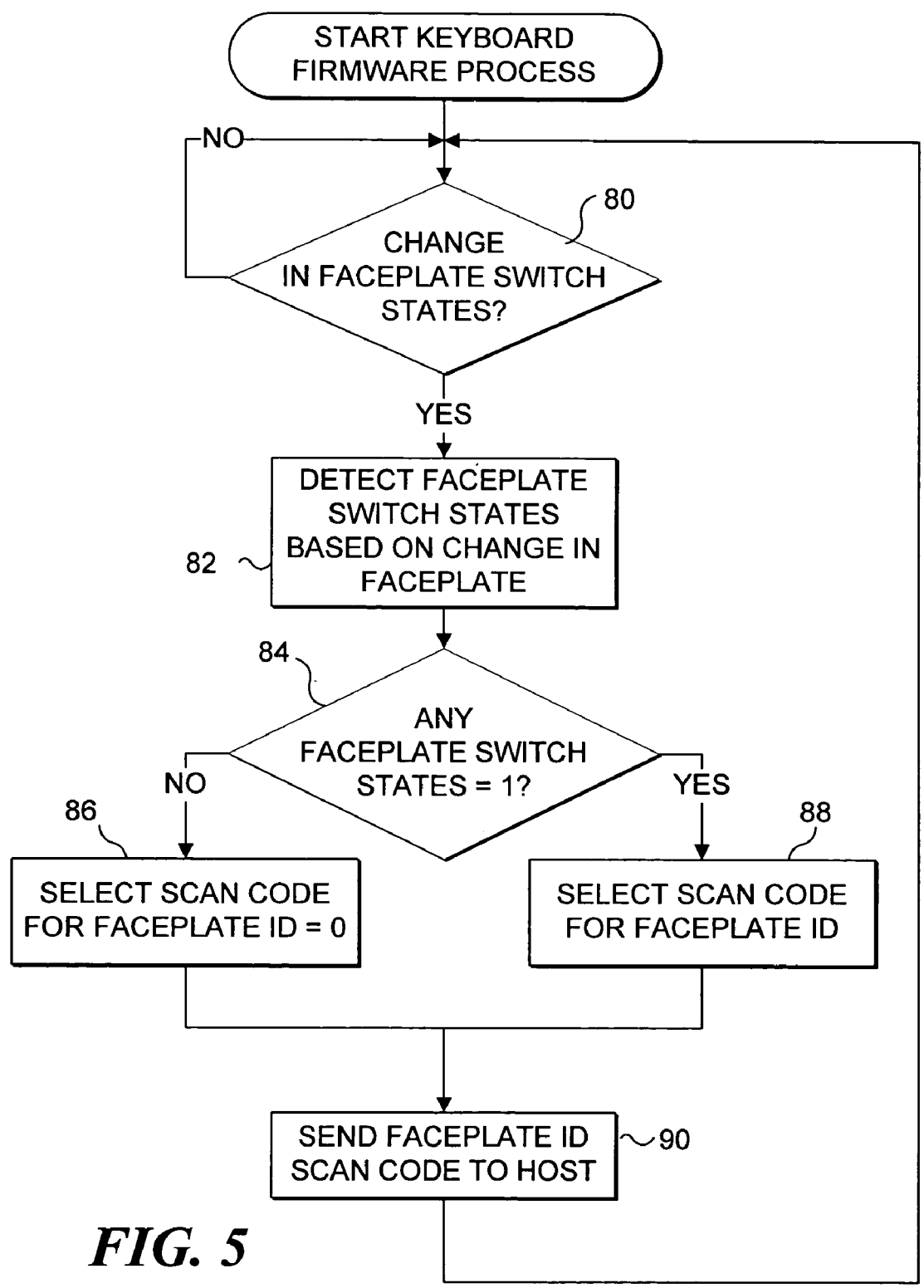
FIG. 5 is a flow diagram illustrating the logic used by the keyboard processor to select a PS/2 scan code to represent a faceplate identification (ID)

FIG. 5 is a flow diagram illustrating the logic used by the keyboard processor to select a PS/2 scan code to represent a faceplate ID. At a decision step 80, the keyboard processor evaluates the faceplate switches to determine whether a change occurred in the state of any of the faceplate switches. If no change occurred, the keyboard processor continues to regularly monitor the states of the keyboard switches. If the keyboard processor detects a change in state of any of the faceplate switches, the keyboard processor detects the faceplate switch states based on a change in the faceplate installed, at a step 82. At a decision step 84, the keyboard processor determines whether any of the faceplate switches have a state of "1." If none of the faceplate switches have a state of 1, none of the faceplate switches are activated, indicating that no faceplate is coupled to the keyboard. If all faceplate switches have a state of "0," the keyboard processor selects a default faceplate scan code, at a step 86, corresponding to a faceplate ID equal to 0. However, if any of the faceplate switches have a state of "1," the keyboard processor selects a faceplate scan code, at a step 88, corresponding to the faceplate ID indicated by the states of the faceplate switches. Once a faceplate scan code is selected, the keyboard processor communicates the selected faceplate scan code through the keyboard communication interface to the host computing device, at a step 90. The faceplate scan code can be communicated in accord with any communication protocol that allows for predefined codes. For example, the keyboard communication interface may communicate according to PS/2, USB, RS232, parallel, wireless, or other protocol.

Host Processing

Figure 6:
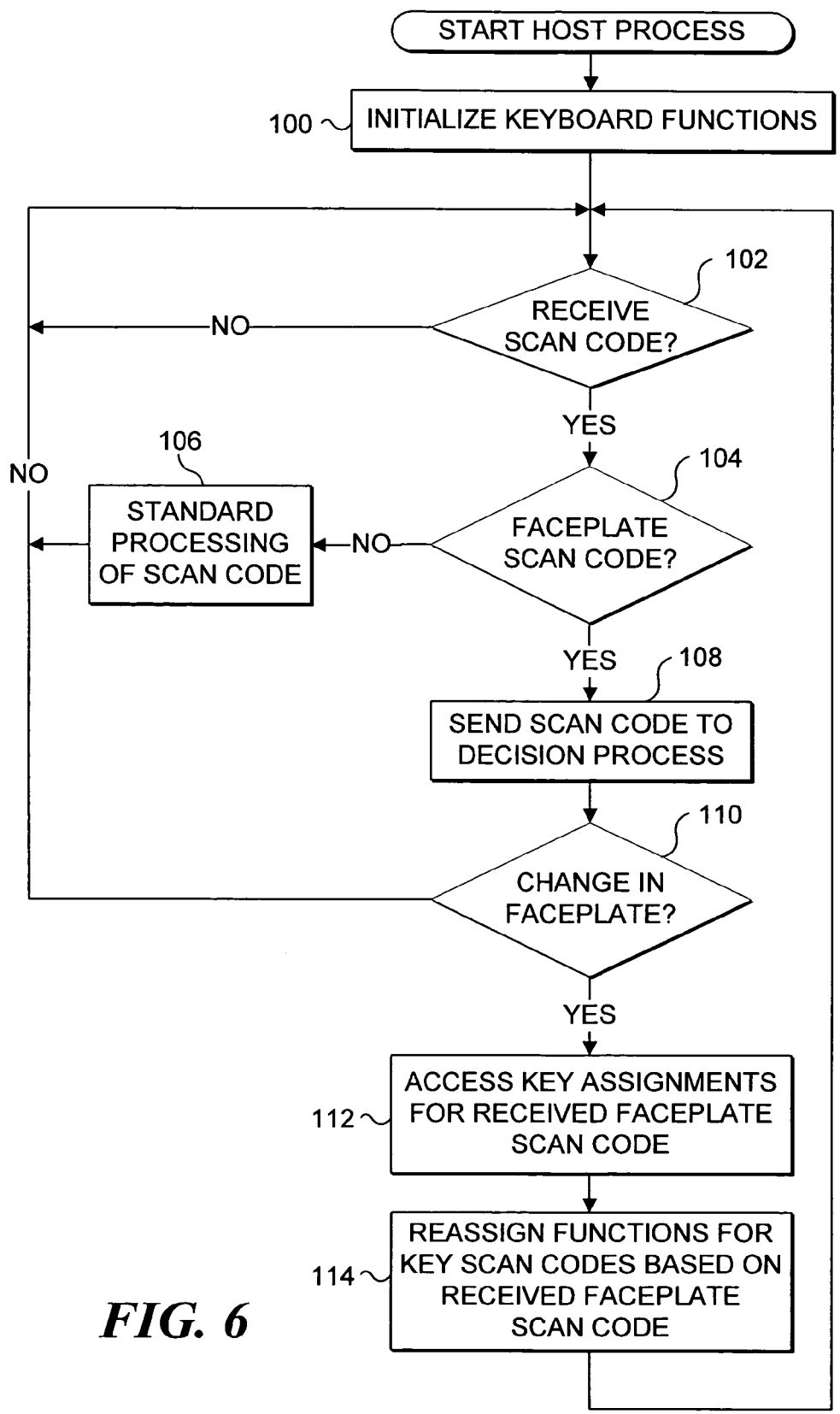
FIG. 6 is a flow diagram illustrating the logic that a host computing device uses when processing keyboard faceplate scan codes.

FIG. 6 is a flow diagram illustrating logic that a host computing device uses to process keyboard faceplate scan codes. At a step 100, the host computing device initializes keyboard functions, such as storing a default faceplate ID. At a decision step 102, a keyboard controller of the host computing device monitors incoming scan codes. When a scan code is detected, the host keyboard controller may perform some preliminary processing, such as converting the scan code from a PS/2 Scan Code Set 1 to Scan Code Set 2. Generally, the keyboard controller would then provide the scan code to the operating system. Preferably, however, for faceplate scan codes, a filter driver or a low level keyboard hook will be provided to intercept the converted scan codes for the faceplate, and will then process the converted scan codes instead of simply passing them onto the operating system. In a preferred embodiment implemented in a Microsoft Corporation WINDOWS™ operating system in connection with using a faceplate with a software application program, the filter driver or hook monitors the incoming stream of scan codes at a decision step 104. The filter driver or hook can check for a flag scan code, which indicates that a faceplate scan code is to follow, or can directly check for a faceplate scan code. So long as conventional keystroke scan codes are received, the logic passes the scan code onto the operating system and loops, so that the operating system processes the scan codes (including assigned function key scan codes) in its normal fashion, at a step 106.

However, when a faceplate scan code reaches the host computing device, the driver or hook invokes a WINDOWS™ application program interface (API) (e.g., SendMessage, PostMessage, SendInput) at a block 108, which sends a message to a faceplate decision process (or other activity unrelated to faceplates, depending upon the use to which the faceplate is being applied), and includes the faceplate scan code as a message argument. The faceplate decision process interprets the intercepted faceplate scan code, at a decision step 110, to determine whether a change occurred from a previously stored faceplate ID (or a default faceplate ID). If a faceplate change did not occur, control returns to the keyboard controller to await another scan code. However, if a faceplate change occurred, the faceplate decision process uses the faceplate ID to access a corresponding set of function key assignments, at a step 112. Once the function key assignments are accessed, the faceplate decision process invokes a WINDOWS™ API to send the function key assignments in a message to the operating system and/or appropriate software application. At a step 114, the operating system and/or software application reassigns the functions to be associated with conventional individual scan codes representing the function keys associated with the faceplate. The reassignment can be performed with control panel APIs, through an extensible markup language (XML) function key mapping file, or other means for defining key assignments. Thus, when the host receives a conventional function key scan code, the operating system and/or software program will invoke the function reassigned to the function key scan code rather than the default (or any previous) function associated with the function key scan code.

Although the present invention has been described in connection with the preferred form of practicing it, those of ordinary skill in the art will understand that many modifications can be made thereto within the scope of the claims that follow. For example, a similar process can be applied to other devices, including pointing devices, game controllers, or other devices with movable members. Accordingly, it is not intended that the scope of the invention in any way be limited by the above description, but instead be determined entirely by reference to the claims that follow.

The invention in which an exclusive right is claimed is defined by the following:

1. A method for automatically enabling one function of a plurality of functions associated with a key of a peripheral device, in response to one of a plurality of different faceplates being coupled to the peripheral device, said peripheral device including a plurality of additional keys, comprising:

(a) enabling a user to couple a selected faceplate from among the plurality of different faceplates to the peripheral device;

(b) automatically detecting the selected faceplate that has been coupled to the peripheral device from among the plurality of different faceplates; and (c) associating the one function with the key, so that said one function is performed in response to actuation of the key, a different function being associated with the key of the peripheral device for each different faceplate detected, so that a functional behavior associated with the key of the peripheral device is dependent upon the faceplate that is coupled to the peripheral device by the user, but functions performed by the plurality of additional keys are unaffected by the faceplate that is coupled to the peripheral device by the user, wherein associating the one function with the key comprises the following:

accessing a function identifier for the one function to be associated with the key for the selected faceplate that has been automatically detected as being coupled to the peripheral device; and assigning the function identifier to a key code for the key of the peripheral device, so that when the key is actuated, the key code is transmitted and detected, invoking the one function associated with the key.

2. The method of claim 1, wherein the peripheral device includes at least one faceplate switch used to detect a faceplate that is coupled to the peripheral device, and wherein the selected faceplate is configured with a protrusion extending from the selected faceplate to interact with and switch said at least one faceplate switch.

3. The method of claim 1, wherein automatically detecting the selected faceplate comprises the steps of:

(a) detecting a state of said at least one faceplate switch; and (b) selecting a predefined code as a function of the state of said at least one faceplate switch that is detected.

4. The method of claim 3, wherein the predefined code is one of a PS/2 scan code and a universal serial bus (USB) human interface device report.

5. The method of claim 3, further comprising:
communicating the predefined code to a host computing device to enable the one function corresponding to the selected faceplate to be associated with the key.

6. The method of claim 5, wherein the predefined code is communicated according to one of a PS/2 protocol, a universal serial bus protocol, a serial communication protocol, a parallel communication protocol, and a wireless communication protocol.

7. A keyboard for operatively coupling to a host computing device and communicating a predefined code from a plurality of predefined codes indicating that a selected faceplate from among a plurality of faceplates is coupled to the keyboard, said predefined code specifying a function to be associated with a key of the keyboard, said function being designated for the selected faceplate, the keyboard comprising:
(a) a key having a state that changes when the key is actuated;
(b) a faceplate detector having a state that depends on a selected faceplate being properly coupled to the keyboard, wherein the selected faceplate is properly coupled to the keyboard when the faceplate, which includes an opening, is positioned with respect to the keyboard in such a way that the opening of the faceplate is disposed around the key of the keyboard and when, at the same time that the opening is disposed around the key, one or more protrusions extending from a bottom surface of the faceplate engage the faceplate detector;
(c) a memory that stores machine-readable instructions and a plurality of predefined codes that conform to a keyboard communication protocol and are used for communicating the state of the faceplate detector; and
(d) a processor in communication with the key, the faceplate detector, and the memory, said processor executing the machine-readable instructions, causing one of the plurality of predefined codes to be selected as a function of the state of the faceplate detector, said processor transmitting the predefined code as an output signal that conforms to the keyboard communication protocol, for input to a host computing device, to enable a host computing device to determine the function to be associated with the state of the key, enabling a host computing device to carry out the function that is associated with the state of the key.

8. The keyboard of claim 7, wherein the state of the faceplate detector depends on a configuration of the selected faceplate relative to the faceplate detector.

9. The keyboard of claim 7, wherein the key is associated with a default function when the state of the faceplate detector corresponds to the selected faceplate not being coupled to the keyboard.

10. The keyboard of claim 7, wherein the key is one of:
(a) integrated into the keyboard and adjacent to the selected faceplate; and
(b) integrated into the selected faceplate.

11. A keyboard as recited in claim 7, wherein the keyboard comprises a full alphanumeric input keyboard.

12. The full alphanumeric input keyboard of claim 11, further comprising additional function actuating keys, each additional function actuating key being associated with a plurality of different functions, so that a set of functions for all of the function actuating keys are selected for use by a host computing device in response to receipt of the predefined code produced by the faceplate detector.

13. A method for communicating an identification of a selected faceplate from among a plurality of faceplates that has been coupled with an input device, said input device being operatively coupled to a host computing device through a keyboard interface that communicates using a standard keyboard communication protocol, comprising:
(a) automatically identifying when a selected faceplate is properly coupled to the input device, wherein the selected faceplate is properly coupled to the input device when the faceplate, which includes an opening, is positioned with respect to the input device in such a way that the opening of the faceplate is disposed around at least one key protruding from the input device and when, at the same time that the opening is disposed around the at least one key, one or more protrusions that extend from a bottom surface of the faceplate engage a faceplate detector of the input device;
(b) selecting a predefined code corresponding to the selected faceplate that is properly coupled to the input device, wherein the predefined code conforms to the standard keyboard communication protocol; and
(c) transmitting a signal that includes the predefined code to the host computing device and which is in conformance with the keyboard communication protocol, enabling the host computing device to modify its response to subsequent input signals from the input device, as a function of the predefined code corresponding to the selected faceplate.

14. The method of claim 13, wherein the faceplate determines one function of a plurality of functions to be associated with a movable member of the input device.

15. A faceplate adapted to be removably coupled to an input device, comprising:
(a) at least one opening formed in the faceplate, so that said at least one opening in the faceplate can be removably disposed around a plurality of keys protruding from an input device; and
(b) identification means for identifying the faceplate when the faceplate is properly coupled to the input device and for enabling the input device to then respond to an identification of the faceplate by modifying functions associated with a plurality of keys on an input device, wherein the selected faceplate is properly coupled to the input device when the faceplate is positioned with respect to the input device in such a way that the opening of the faceplate is disposed around at least one key of the plurality of keys protruding from the input device and when, at the same time that the opening is disposed around the at least key, one or more protrusions that extend from a bottom surface of the faceplate engage the input device.

16. The faceplate of claim 15, wherein the identification means comprise a plurality of tabs extending from a perimeter of the faceplate, said plurality of tabs being disposed at predefined locations to interact with sensors on an input device to supply the identification of the faceplate to an input device.

17. The faceplate of claim 15, wherein a plurality of separate openings are included, each opening being sized to fit around a different key on an input device.

18. The faceplate of claim 15, further comprising indications of the functions associated with a plurality of keys on an input device, by removably coupling the faceplate to an input device.

19. The faceplate of claim 18, wherein the indications comprise text labels for each of a plurality of keys.

20. A faceplate as recited in claim 15, wherein the faceplate includes at least one moving key that moves relative to a body portion of the faceplate.

* * * * *